(12) United States Patent
Zhang

(10) Patent No.: US 8,933,646 B2
(45) Date of Patent: Jan. 13, 2015

(54) PROTECTION CIRCUIT FOR BACKLIGHT DRIVER CIRCUIT, BACKLIGHT MODULE, AND LCD DEVICE

(71) Applicant: Shenzhen China Star Optoelectronics Technology Co., Ltd., Shenzhen (CN)

(72) Inventor: Xianming Zhang, Shenzhen (CN)

( * ) Notice: Subject to any disclaimer, the term of this patent is extended or adjusted under 35 U.S.C. 154(b) by 74 days.

(21) Appl. No.: 13/809,441

(22) PCT Filed: Dec. 24, 2012

(86) PCT No.: PCT/CN2012/087259
§ 371 (c)(1),
(2) Date: Jan. 10, 2013

(87) PCT Pub. No.: WO2014/094320
PCT Pub. Date: Jun. 26, 2014

(65) Prior Publication Data
US 2014/0176020 A1    Jun. 26, 2014

(30) Foreign Application Priority Data

Dec. 20, 2012 (CN) .......................... 2012 1 0558760

(51) Int. Cl.
*H05B 37/02* (2006.01)
*H05B 41/285* (2006.01)
*H05B 33/08* (2006.01)

(52) U.S. Cl.
CPC ........ *H05B 41/2856* (2013.01); *H05B 33/0887* (2013.01)
USPC ........... 315/297; 315/186; 315/193; 315/119; 315/268

(58) Field of Classification Search
CPC ........ H05B 41/36; H05B 41/14; H05B 41/24; H01H 37/02
USPC ......... 315/119, 268, 186, 122, 193, 307, 297; 337/298
See application file for complete search history.

(56) References Cited

U.S. PATENT DOCUMENTS 6,111,739 A * 8/2000 Wu et al. ........................ 361/106
6,147,434 A * 11/2000 Nakano et al. ................ 310/317

(Continued)

FOREIGN PATENT DOCUMENTS

CN    101392875 A    3/2009
CN    201306647 Y    9/2009

(Continued)

OTHER PUBLICATIONS

Wang Ji, The International Searching Authority written comments, Oct. 2013, CN.

*Primary Examiner* — Douglas W Owens
*Assistant Examiner* — Wei Chan

(57) ABSTRACT

A protection circuit of a backlight driver circuit includes a backlight driver circuit. The backlight driver circuit includes a backlight driver integrated circuit (IC), and the backlight driver IC includes a protection pin that controls the backlight driver IC to enter a protection mode. The backlight driver circuit further includes a protection circuit, and the protection circuit includes a monitoring unit that monitors a temperature of the backlight driver circuit. When the temperature of the backlight driver circuit exceeds a preset temperature, the monitoring unit sends the protection signal to the protection pin to control the backlight driver IC to enter the protection mode.

15 Claims, 3 Drawing Sheets

(56) References Cited

U.S. PATENT DOCUMENTS

| | | | |
|---|---|---|---|
| 6,265,809 B1* | 7/2001 | Fujii et al. | 310/317 |
| 6,806,871 B1* | 10/2004 | Yasue | 345/211 |
| 7,095,182 B2* | 8/2006 | Ando et al. | 315/209 T |
| 7,140,752 B2* | 11/2006 | Ashdown | 362/276 |
| 7,196,481 B2* | 3/2007 | Bushell et al. | 315/291 |
| 7,741,788 B2* | 6/2010 | Ito et al. | 315/247 |
| 7,948,190 B2* | 5/2011 | Grajcar | 315/291 |
| 8,174,205 B2* | 5/2012 | Myers et al. | 315/291 |
| 8,456,096 B2* | 6/2013 | Kwok et al. | 315/219 |
| 2002/0021539 A1* | 2/2002 | Odaohhara et al. | 361/103 |
| 2005/0240312 A1* | 10/2005 | Terry et al. | 700/276 |
| 2006/0087790 A1* | 4/2006 | Goto | 361/103 |
| 2006/0170368 A1* | 8/2006 | Jang | 315/118 |
| 2007/0085494 A1* | 4/2007 | Takeda et al. | 315/316 |
| 2008/0174929 A1 | 7/2008 | Shen et al. | |
| 2008/0180871 A1 | 7/2008 | Hebert et al. | |
| 2008/0203946 A1* | 8/2008 | Ito et al. | 315/307 |
| 2009/0140656 A1* | 6/2009 | Kohashikawa et al. | 315/151 |
| 2010/0033113 A1* | 2/2010 | Maruyama et al. | 315/309 |
| 2010/0045190 A1* | 2/2010 | Cramer | 315/151 |
| 2011/0037387 A1* | 2/2011 | Chou et al. | 315/35 |
| 2011/0062884 A1* | 3/2011 | Jang et al. | 315/291 |
| 2011/0080431 A1* | 4/2011 | Sasaki | 345/690 |
| 2011/0148835 A1* | 6/2011 | Yamazaki | 345/207 |
| 2011/0163689 A1* | 7/2011 | Kim et al. | 315/294 |
| 2011/0205258 A1* | 8/2011 | Suminoe et al. | 345/690 |
| 2011/0298374 A1* | 12/2011 | Lenk et al. | 315/50 |
| 2012/0139420 A1* | 6/2012 | Lee et al. | 315/122 |
| 2012/0212144 A1* | 8/2012 | Hayashi et al. | 315/193 |
| 2013/0134882 A1* | 5/2013 | Nuhfer et al. | 315/119 |
| 2013/0307422 A1* | 11/2013 | Palmer et al. | 315/186 |
| 2014/0009455 A1* | 1/2014 | Li et al. | 345/212 |
| 2014/0028377 A1* | 1/2014 | Rosik et al. | 327/513 |
| 2014/0139499 A1* | 5/2014 | Hussain et al. | 345/204 |
| 2014/0221051 A1* | 8/2014 | Oguri | 455/566 |

FOREIGN PATENT DOCUMENTS

| | | |
|---|---|---|
| CN | 201374846 Y | 12/2009 |
| CN | 201422183 Y | 3/2010 |
| CN | 201450642 U | 5/2010 |
| CN | 201733073 U | 2/2011 |
| CN | 102169672 A | 8/2011 |
| JP | 2004-96804 A | 3/2004 |

* cited by examiner

PROTECTION CIRCUIT FOR BACKLIGHT DRIVER CIRCUIT, BACKLIGHT MODULE, AND LCD DEVICE

TECHNICAL FIELD

The present disclosure relates to the field of liquid crystal displays (LCDs), and more particularly to a protection circuit for a backlight driver circuit, a backlight module, and an LCD device.

BACKGROUND

A liquid crystal display (LCD) device includes a backlight driver circuit that often uses a backlight driver integrated circuit (IC) to adjust backlight brightness. The backlight driver IC itself has a temperature protection function: when normal operation of the backlight driver IC is affected because of an increase in temperature of the backlight driver IC, the backlight driver IC automatically enters a protection mode to reduce the backlight, brightness or directly stop operation, which increases service life of the backlight driver circuit. However, there are higher failure rates in typical backlight driver circuit, malfunctions such as dimming function, no backlight output occur when the backlight driver circuit is used for a period of time. If there is no problem in the backlight driver IC, however, when the temperature of the backlight driver IC drops below a protection temperature, the malfunctions may still exist which affects service life of the backlight driver circuit.

SUMMARY

In view of the above-described problems, the aim of the present disclosure is to provide a protection circuit of a backlight driver circuit, a backlight driver circuit, and a liquid crystal display (LCD) thereof capable of increasing the service life of the backlight driver circuit.

The aim of the present disclosure is achieved by the following technical scheme.

A protection circuit of a backlight driver circuit, the backlight driver circuit comprises a protection pin that controls a backlight driver integrated circuit (IC) to enter a protection mode, and the protection circuit comprises a monitoring unit that monitors a temperature of the backlight driver circuit.

When the temperature of the backlight driver circuit exceeds the preset temperature, the monitoring unit sends a protection signal to the protection pin to control the backlight driver IC to enter the protection mode.

Furthermore, the monitoring unit comprises a controllable switch that, is connected in series between the protection pin and a ground end of the backlight driver circuit, and a control end of the controllable switch is coupled to a temperature control assembly.

When the temperature of the backlight driver circuit exceeds the preset temperature, the temperature control assembly controls the controllable switch to turn on. This is a technical scheme that the backlight driver IC enters the protection mode when the protection pin is at a low level. When the temperature of the backlight driver circuit exceeds the preset temperature, the controllable switch is turned on, the protection pin is directly connected to the ground end, and the potential of the protection pin is reduced, thus, the backlight driver IC enters the protection mode. When the temperature returns to normal state, the controllable switch is turned off, and a high potential of the protection pin is reset, thus, the backlight driver IC can normally operate again.

Furthermore, the temperature control assembly comprises a high-level first reference voltage. A first resistor and a thermistor are connected in series between the high-level first reference voltage and the ground end of the backlight driver circuit, the control end of the controllable switch is coupled between the first resistor and the thermistor, and a voltage of the control end of the controllable switch is a voltage of the first resistor or a voltage of the thermistor. This is the first specific circuit structure of the temperature control assembly. The voltage of the first resistor or the voltage of the thermistor control the controllable switch by using resistance division. Because the resistance of the thermistor changes when temperature changes, the voltage of the first resistor or the voltage of the thermistor changes if the first reference voltage is constant. Therefore, each of the temperatures corresponds to a voltage. A connection voltage of the controllable switch can be set in accordance with the preset temperature by a routine measuring means, to turn on the controllable switch.

Furthermore, the thermistor has a positive temperature coefficient and is connected to the ground end of the backlight driver circuit. The controllable switch is turned on at a high level. This is a specific thermistor. The voltage of the control end of the controllable switch is the voltage of the thermistor. The resistance of the thermistor with positive temperature coefficient is increased when the temperature increases, and the voltage is increased as well. The controllable switch is turned on when the voltage exceeds the connection voltage of the controllable switch.

Furthermore, the temperature control assembly comprise a comparator. A non-inverting input end of the comparator is coupled between the first resistor and the thermistor, an inverting input end of the comparator is coupled to a second reference voltage, and the output end of the comparator is coupled to the control, end of the controllable switch. The output signal, of the comparator is either a low-level signal or a high-level signal, there is a significant difference between the two level signals, the voltage of the low-level signal is significantly lower than the connection voltage of the controllable switch, and the voltage of the high-level signal is significantly greater than the connection voltage of the controllable switch. Thus, the controllable switch can accurately operate.

Furthermore, the temperature control assembly comprises a high-level third reference voltage. A second resistor and a bimetallic strip tempera tore controller are connected in series between the high-level third reference voltage and the ground end of the backlight driver circuit, and the control end of the controllable switch is coupled between the second resistor and the bimetallic strip temperature controller.

When the temperature of the backlight driver circuit exceeds the preset temperature, the two bimetallic strips of the bimetallic strip temperature controller are electrically connected. This is the second specific circuit structure of the temperature control assembly. At this moment, the voltage of the second resistor controls the controllable switch. If the bimetallic strip temperature controller is electrically connected to the high-level third reference voltage, the two bimetallic strips of the bimetallic strip temperature controller in the initial state are disconnected, the circuit is turned off, the voltage of the second resistor is zero, and the controllable switch is turned off. When the temperature reaches the preset temperature, the two bimetallic strips are electrically connected, the circuit is turned on, the voltage of the second resistor is equal to the high-level third reference voltage, and the controllable switch is turned on. Thus, the voltage signal connected to the controllable switch is either a low-level signal or a high-level signal, the voltage of the low-level signal is significantly lower than the connection voltage of the controllable switch, the voltage of the high-level signal is significantly greater than, the connection voltage of the controllable switch, and there is a significant difference between the two level signals. Thus, the controllable switch can accurately operate.

Furthermore, the temperature control assembly comprises a comparator. The non-inverting input end of the comparator is coupled between the second resistor and the bimetallic strip temperature controller, the inverting input end of the comparator is coupled to a fourth reference voltage, and the output end of the comparator is coupled to the control end of the controllable switch. The output signal of the comparator is either a low-level signal or a high-level signal, there is a significant difference between the two level signals, the voltage of the low-level signal is significantly lower than the connection voltage of the controllable switch, and the voltage of the high-level signal is significantly greater than the connection voltage of the controllable switch. Thus, the controllable switch can accurately operate.

Furthermore, the protection circuit of the backlight driver circuit comprises a detection module that detects the temperature of the backlight driver IC. A third resistor is connected between the output end of the detection module and the protection pin of the backlight driver IC. This is an own temperature protection function of the backlight driver IC. The backlight driver IC sends own temperature information to tire detection module. When the temperature of the backlight driver IC is lower than the protection temperature, the detection module sends a high-level signal to the protection pin, when the temperature is greater than the protection temperature, the detection module sends a low-level signal to the protection pin, and the backlight driver IC enters the protection mode.

A backlight driver circuit comprises a backlight driver IC and the protection circuit of the present disclosure. The backlight driver IC comprises a protection pin that controls the backlight, driver IC to enter the protection mode.

An LCD device comprises the backlight driver circuit of the present disclosure.

Because the backlight driver circuit further comprises other electronic components, the electronic components having an increase of temperature due to electronic components being positioned close to a light-emitting source or because they have a low temperature resistance, at this moment, though a temperature protection threshold of the driver IC is not achieved, the temperature is high enough to burn the electronic components or cause fire, resulting in circuit failure. Thus, the service life of the backlight driver circuit is shortened. In the present disclosure, the protection circuit is used, the protection circuit comprises a monitoring unit that monitors a temperature of the backlight driver circuit, the monitoring unit is arranged outside the backlight driver IC of the backlight driver circuit, in particular, the monitoring unit is arranged in a hot position, such as in a positions that is closer to a light source and a heat source in the backlight driver circuit, to monitor the temperature of the backlight driver circuit. A specific position of the monitoring unit can be optimally selected in accordance with design requirements. Through routine measuring means, a limit temperature of electronic components having a lower temperature resistance can be used as a preset temperature. When the temperature of the backlight driver circuit exceeds the preset temperature, the monitoring unit switches the driver IC to protection mode by controlling the protection pin, which may reduce power output of the entire backlight driver circuit, even turn off the backlight driver circuit, reduce the temperature of the backlight driver circuit, and avoid damaging the electronic components because of high temperature. Thus, temperature protection to the electronic components of the backlight driver circuit is achieved, and the service life of the backlight driver circuit is increased. In addition, because the present disclosure uses the protection pin of typical backlight driver IC to achieve the temperature protection to other electronic components, the backlight driver circuit becomes simpler and reduces design and production cost is reduced.

Legends: 1. backlight driver IC; 2. protection pin; 3. temperature control assembly; 4. detection module; 5. backlight driver circuit; 6. monitoring unit; 7. protection circuit.

DETAILED DESCRIPTION

Figure 1:
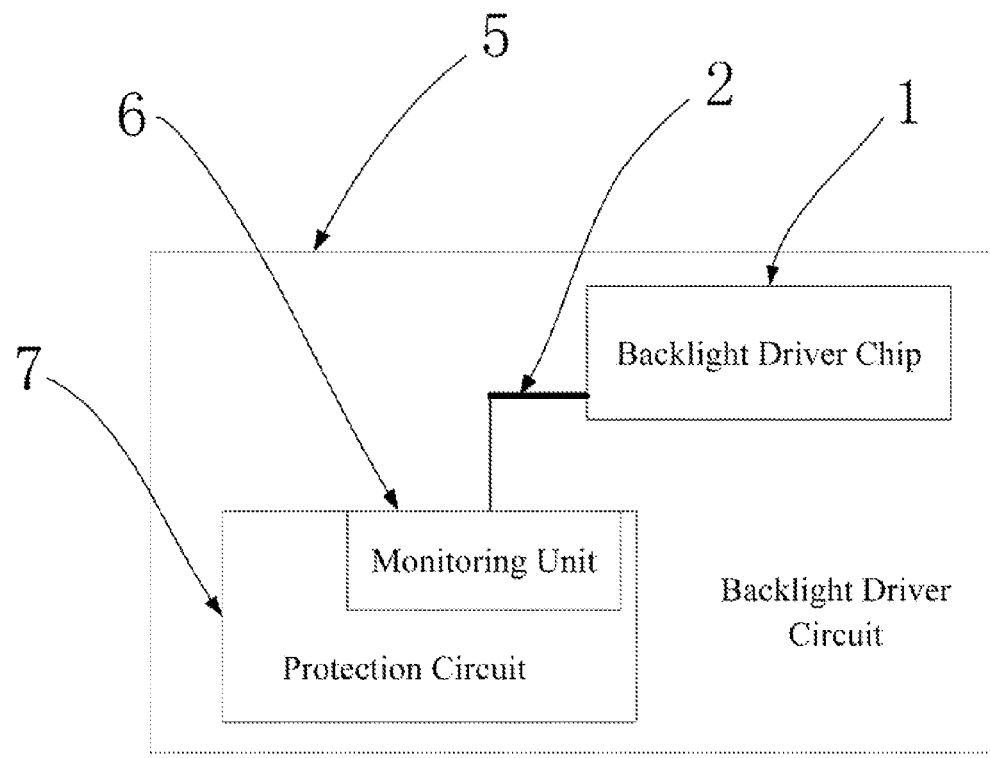
FIG. 1 is a schematic diagram of an example of the present disclosure.

The present disclosure provides a liquid crystal display (LCD) device that comprises a backlight module. The backlight module comprises a backlight driver circuit 5. As shown in FIG. 1, the backlight, driver circuit 5 comprises a backlight driver integrated circuit (IC) 1 and a protection circuit 7. The backlight driver IC 1 comprises a protection pin 2 that controls the backlight driver IC to enter a protection mode. The protection circuit 7 of the backlight driver circuit 5 comprises a monitoring unit 6 that monitors temperature of the backlight driver circuit 5. When temperature of the backlight driver circuit 5 exceeds a preset temperature, the monitoring unit 6 sends a protection signal to the protection pin to control the backlight driver IC 1 to enter the protection mode.

Because the backlight driver circuit 5 further comprises other electronic components, the electronic components having an increase of temperature due to the electronic components being positioned close to a light-emitting source or because they have a low temperature resistance, at this moment, though a temperature protection threshold of the backlight driver IC 1 is not achieved, the temperature of the backlight driver IC 1 is high enough to burn the electronic components or cause fire, resulting in circuit failure. Thus, service life of the backlight driver circuit is shortened. In the present disclosure, the protection circuit is used, the protection circuit comprises the monitoring unit that monitors a temperature of the backlight driver circuit 5. The monitoring unit 6 is arranged outside the backlight driver IC 1 of the backlight driver circuit 5, in particular, the monitoring unit 6 is arranged in a hot position, such as in a position that is closer to a light source and a heat source in the backlight driver circuit 5, to monitor the temperature of the backlight driver circuit 5. A specific position of the monitoring unit 6 can be optimally selected in accordance with design requirements. Through routine measuring means, a limit temperature of electronic components having a lower temperature resistance can be used as a preset temperature. When the temperature of the backlight driver circuit 5 exceeds the preset temperature, the monitoring unit 6 switches the backlight driver IC to enter the protection mode by controlling the protection pin 2, which may reduce power output of the entire backlight driver circuit, even turn off the backlight driver circuit 5, reduce the temperature of the backlight driver circuit 5, and avoid damaging the electronic components because of high temperature. Thus, temperature protection to the electronic components of the backlight driver circuit 5 is achieved, and the service life of the backlight driver circuit 5 is increased. In addition, because the present disclosure uses the protection pin 2 of typical backlight driver IC to achieve the temperature protection of the electronic components, the backlight driver circuit is simple and design and production cost is reduced.

The present disclosure will further be described in detail in accordance with the figures and the examples.

Example 1

Figure 2:
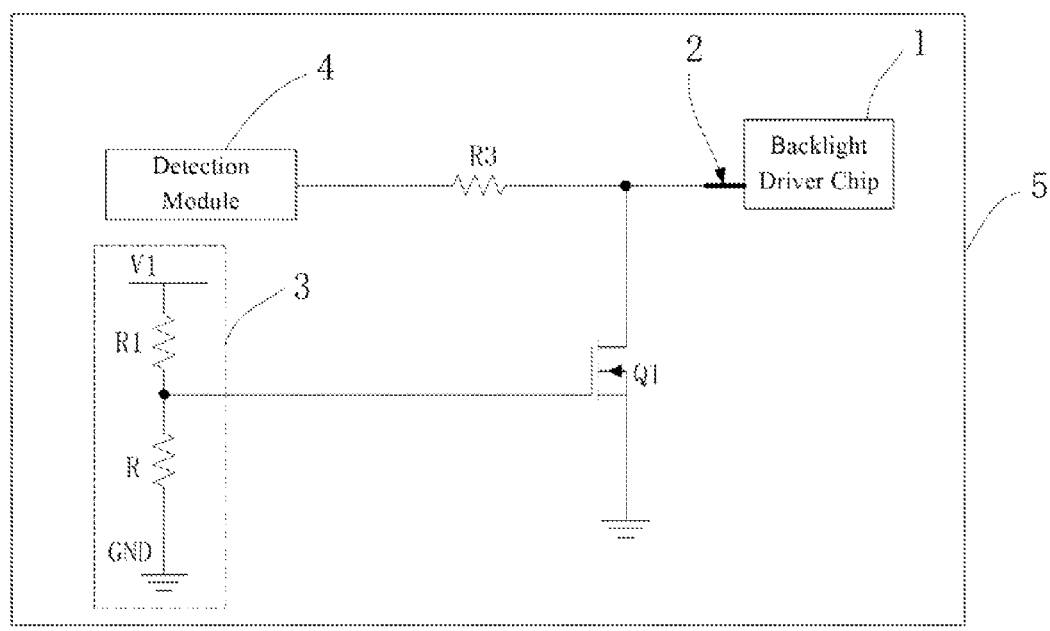
FIG. 2 is a schematic diagram of a first example of the present disclosure.

As shown in FIG. 2, the backlight driver circuit 5 of the example comprises the backlight driver IC 1. The backlight driver IC 1 comprises the protection pin 2 that controls the backlight driver IC 1 to enter the protection mode. The backlight driver circuit 5 further comprises the protection circuit 7. The protection circuit 7 comprises the monitoring unit 6 that monitors the temperature of the backlight driver circuit 5.

The monitoring unit 6 comprises a controllable switch Q1 that is connected in series between the protection pin 2 and a ground end GND of the backlight driver circuit 5, and a control end of the controllable switch Q1 is coupled to a temperature control assembly 3.

The temperature control assembly 3 comprises a high-level first reference voltage V1. A first resistor R1 and a thermistor R are connected in series between the high-level first reference voltage V1 and the ground end GND of the backlight driver circuit 5, the control end of the controllable switch Q1 is coupled between the first resistor R1 and the thermistor R, and a voltage of the control end of the controllable switch Q1 is a voltage of the first second resistor R1 or a voltage of the thermistor R. The thermistor R has a positive temperature coefficient and is connected to the ground end GND of the backlight driver circuit 5. The high-level first reference voltage V1 can select voltages such as 3.3V; 5V that often are used in digital circuits.

This is one specific circuit, structure of the temperature control assembly 3. The voltage of the first resistor R1 or the voltage of the thermistor R controls the controllable switch Q1 by using resistance division. Because resistance of the thermistor R changes when temperature changes, the voltage of the first resistor R1 or the voltage of the thermistor R changes if the high-level first reference voltage is constant. Therefore, each of the temperatures corresponds to a voltage. A connection voltage of the controllable switch Q1 can be set in accordance with the preset temperature by a routine measuring means, to turn on the controllable switch Q1. The voltage of the control end of the controllable switch Q1 is the voltage of the thermistor R. The resistance of the thermistor R that has the positive temperature coefficient is increased when the temperature increases, and the voltage of the thermistor R is increased as well. The controllable switch Q1 is turned on when the voltage exceeds the connection voltage of the controllable switch Q1. The protection pin 2 is directly connected to the ground end GND, and potential of the protection pin 2 is reduced, thus, the backlight driver IC 1 enters the protection mode. When the temperature returns to a normal state, the controllable switch Q1 is turned off, and a high potential of the protection pin 2 is reset, thus, the backlight driver IC 1 can normally operate again. Optionally, the present disclosure can further select a thermistor that has a negative temperature coefficient, and operation of the controllable switch Q1 should be changed accordingly.

The protection circuit of the backlight driver further comprises a detection module that detects the temperature of the backlight driver IC 1. A third resistor R3 is connected between an output end of the detection module 4 and the protection pin 2 of the backlight driver IC 1. The backlight driver IC 1 itself has a temperature protection. The backlight driver IC 1 sends own temperature information to the detection module 4. When the temperature of the backlight driver IC 1 is lower than the protection temperature, the detection module 4 sends a high-level signal to the protection pin 2, when the temperature of the backlight driver IC 1 is greater than the protection temperature, the detection module 4 sends a low-level signal to the protection pin 2, and the backlight driver IC enters the protection mode.

Example 2

Figure 3:
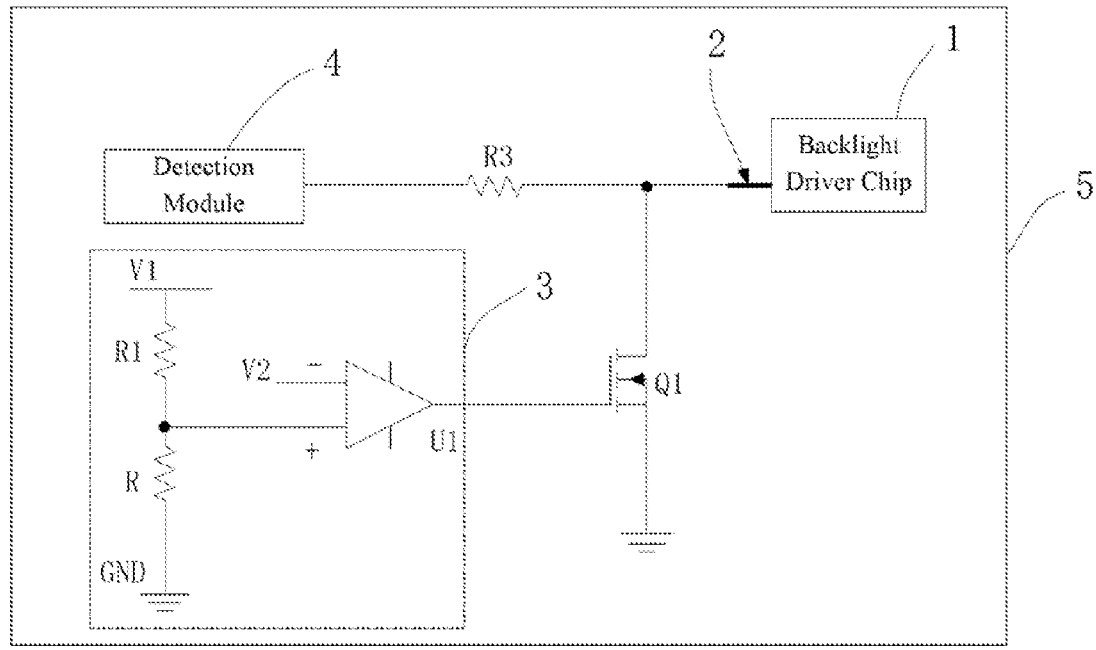
FIG. 3 is a schematic diagram of a second example of the present disclosure.

As shown in FIG. 3, the backlight driver circuit 5 of the example comprises the backlight driver IC 1. The backlight driver IC 1 comprises the protection pin 2 that controls the backlight driver IC 1 to enter the protection mode. The backlight driver circuit 5 further comprises the protection circuit. The protection circuit comprises a monitoring unit that monitors a temperature of the backlight driver circuit 5.

The monitoring unit 6 comprises the controllable switch Q1 that is connected in series between the protection pin 2 and the ground end GND of the backlight driver circuit 5, and the control end of the controllable switch Q1 is coupled to the temperature control assembly 3.

The temperature control assembly 3 comprises a comparator U1 and the high-level first reference voltage V1. The first resistor R1 and the thermistor R are connected in series between the high-level first reference voltage V1 and the ground end GND of the backlight driver circuit 5, the control end of the controllable switch Q1 is coupled between the first resistor R1 and the thermistor R, a non-inverting input end of the comparator U1 is coupled between the first resistor R1 and the thermistor R, an inverting input end of the comparator U1 is coupled to a second reference voltage V2, and an output end of the comparator U1 is coupled to the control end of the controllable switch Q1. The thermistor R has a positive temperature coefficient, and the thermistor R is connected to the ground end GND of the backlight driver circuit 5. The high-level first reference voltage V1 can select voltages such as 3.3V, 5V that often are used in digital circuits, and the second reference voltage V2 can select voltage in accordance with the voltage corresponding to the preset temperature and a characteristic of the comparator U1.

This is a second specific circuit structure of the temperature control assembly 3. A voltage of the first resistor R1 or a voltage of the thermistor R controls the controllable switch Q1 by using resistance division. Because resistance of the thermistor R changes when temperature changes, the voltage of the first resistor R1 or the voltage of the thermistor R changes on the premise that the high-level first reference voltage V1 is constant. Therefore, each of the temperatures corresponds to a voltage. The connection voltage of the controllable switch Q1 can be set in accordance with the preset temperature by a routine measuring means. The voltage of the control end of the controllable switch Q1 is the voltage of the thermistor R. The resistance of the thermistor R that has the positive temperature coefficient is increased when the temperature rises, and the voltage of the thermistor R is increased as well. The controllable switch Q1 is turned on when the voltage exceeds the connection voltage of the controllable switch Q1, the protection pin 2 is directly connected to the ground end GND, and potential of the protection pin 2 is reduced, thus, the backlight driver IC 1 enters the protection mode. When the temperature rearms to a normal state, the controllable switch Q1 is turned off, and a high potential of the protection pin 2 is reset, thus, the backlight driver IC 1 can normally operate again. Optionally, the present disclosure can further select a thermistor that has a negative temperature coefficient, and operation of the controllable switch Q1 should be changed accordingly.

The protection circuit 7 of the backlight driver circuit 5 further comprises the detection module 4 that detects the temperature of the backlight driver IC 1. The third resistor R3 is connected between the output end of the detection module 4 and the protection pin 2 of the backlight driver IC 1. The backlight driver IC 1 itself has the temperature protection. The backlight driver IC 1 sends own temperature information to the detection module 4. When the temperature of the backlight driver IC 1 is lower than the protection temperature, the detection module 4 sends the high-level signal to the protection pin 2, when the temperature of the backlight driver IC 1 is greater than the protection temperature, the detection module 4 sends the low-level signal to the protection pin 2, and the backlight driver IC 1 enters the protection mode.

The comparator U1 is used in the example on the basis of the first example. Because an output signal of the comparator U1 is either a low-level signal or a high-level signal, there is a significant difference between the two level signals, the voltage of the low-level signal is significantly lower than the connection voltage of the controllable switch Q1, and the voltage of the high-level signal is significantly greater than the connection voltage of the controllable switch Q1. Thus, the controllable switch Q1 can accurately operate.

Example 3

Figure 4:
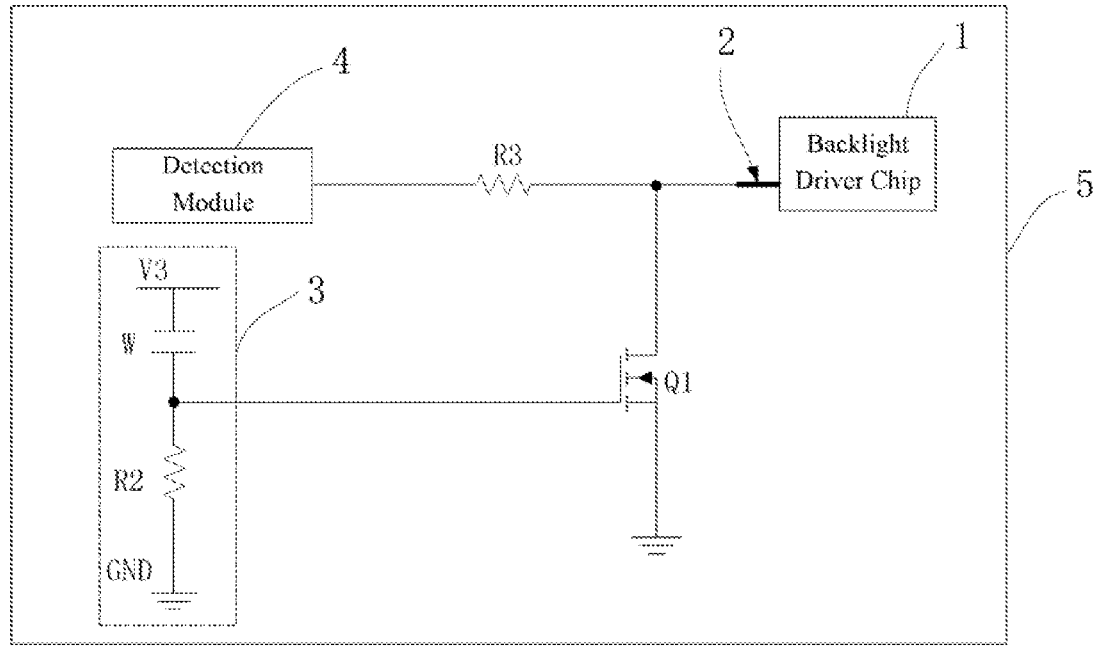
FIG. 4 is a schematic diagram of a third example of the present disclosure.

As shown in FIG. 4, the backlight driver circuit 5 of the example comprises the backlight driver IC 1. The backlight driver IC 1 comprises the protection pin 2 that controls the backlight, driver IC 1 to enter the protection mode. The backlight driver circuit 5 further comprises the protection circuit 7. The protection circuit 7 comprises a monitoring unit 6 that monitors a temperature of the backlight driver circuit 5.

The monitoring unit 6 comprises the controllable switch Q1 that is connected in series between the protection pin 2 and the ground end GND of the backlight driver circuit 5, and the control end of the controllable switch Q1 is coupled to the temperature control assembly 3.

The temperature control assembly 3 comprises a high-level third reference voltage V3. A second resistor R2 and a bimetallic strip temperature controller W are connected in series between the high-level third reference voltage V3 and the ground end GND of the backlight driver circuit 5, and the control end of the controllable switch Q1 is coupled between the second resistor R2 and the bimetallic strip temperature controller W. When the temperature of the backlight driver circuit 5 is greater than the preset temperature, two bimetallic strips of the bimetallic strip temperature controller W are electrically connected. The high-level third reference voltage V3 can select voltages such as 3.3V, 5V that often are used in digital circuits.

The protection circuit 7 of the backlight driver circuit 5 further comprises the detection module 4 that detects the temperature of the backlight driver IC 1. A third resistor R3 is connected between the output end of the detection module 4 and the protection pin 2 of the backlight driver IC 1. The backlight driver IC 1 itself has a temperature protection function. The backlight driver IC 1 sends own temperature information to the detection module 4. When the temperature of the backlight driver IC 1 is lower than the protection temperature, the detection module 4 sends a high-level signal to the protection pin 2, when the temperature of the backlight driver IC 1 is greater than the protection temperature, the detection module 4 sends the low-level signal to the protection pin 2, and the backlight driver IC 1 enters the protection mode.

This is the third circuit structure of the temperature control assembly 3. At this moment, a voltage of the second resistor R2 controls the controllable switch Q1. If the bimetallic strip temperature controller W is connected to the high-level third reference voltage V3, the two bimetallic strips of the bimetallic strip temperature controller W in an initial state are disconnected, and the circuit is turned off. The voltage of the second resistor R2 is zero, and the controllable switch Q1 is turned off. When temperature of the backlight driver IC 1 reaches the preset temperature, the two bimetallic strips of the bimetallic strip temperature controller are electrically connected, the circuit is turned on, and the voltage of the second resistor R2 is equal to the high-level third reference voltage V3, the controllable switch Q1 is turned on. Thus, the voltage signal connected to the controllable switch Q1 is either a low-level signal or a high-level signal, the voltage of low-level signal is significantly lower than the connection voltage of the controllable Q1, the voltage of the high-level signal is significantly greater than the connection voltage of the controllable Q1, and there is a significant difference between the two level signals. Thus, the controllable switch Q1 can accurately operate.

Example 4

Figure 5:
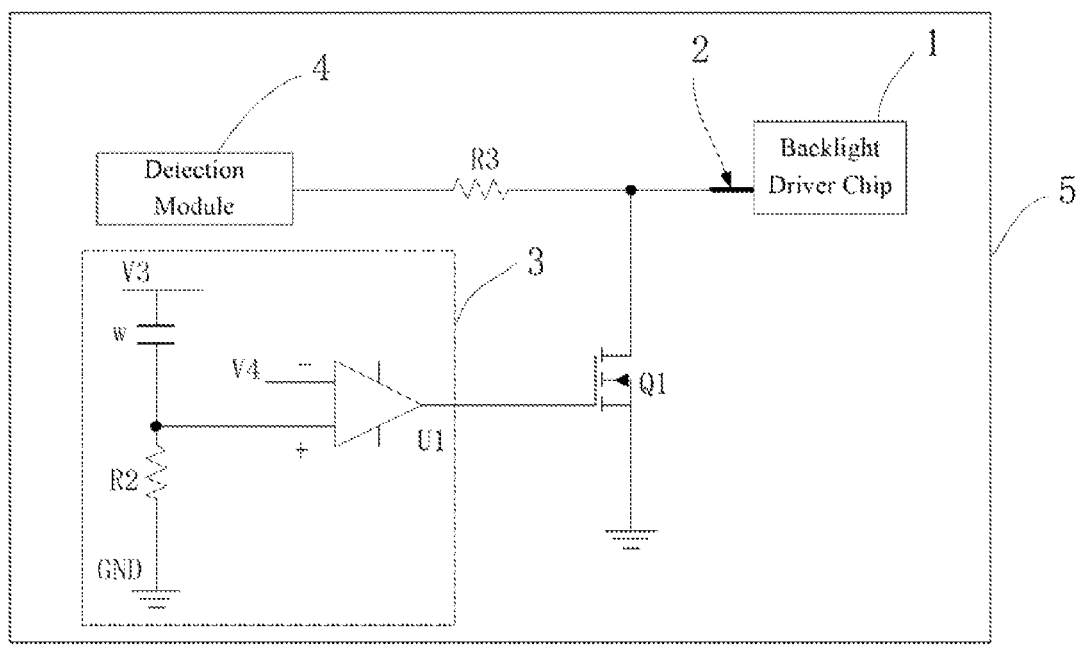
FIG. 5 is a schematic diagram of a fourth example of the present disclosure.

As shown in FIG. 5, the backlight driver circuit 5 of the example comprises the backlight driver IC 1. The backlight driver IC 1 comprises the protection pin 2 that controls the backlight driver IC 1 to enter the protection mode. The backlight, driver circuit 5 further comprises the protection circuit 7. The protection circuit 7 comprises the monitoring unit 6 that monitors a temperature of the backlight driver circuit 5.

The monitoring unit 6 comprises a controllable switch Q1 that is connected series between the protection pin 2 and the ground end GND of the backlight driver circuit 5, and the control end of the controllable switch Q1 is coupled to the temperature control assembly 3.

The temperature control assembly 3 comprises the comparator U1 and the high-level third reference voltage V3. A second resistor R2 and a bimetallic strip temperature controller W are connected in series between the high-level third reference voltage V3 and the ground end GND of the backlight driver circuit 5, the non-inverting input end of the comparator U1 is coupled between the second resistor R2 and the bimetallic strip temperature controller W, the inverting input end of the comparator U1 is coupled to a fourth reference voltage, and the output end of the comparator is coupled to the control end of the controllable switch Q1.

When the temperature of the backlight driver circuit 5 exceeds the preset temperature, the two bimetallic strips of the bimetallic strip temperature controller W are electrically connected. The high-level third reference voltage V3 can select voltages such as 3.3V, 5V that often are used in the digital circuits. The fourth reference voltage can be selected in accordance with the voltage corresponding to preset temperature and a characteristic of the comparator U1.

The protection circuit 7 of the backlight driver circuit 5 further comprises the detection module 4 that detects the temperature of the backlight, driver IC 1. A third resistor R3 is connected between an output end of the detection module 4 and the protection pin 2 of the backlight driver IC 1. The backlight driver IC 1 itself has a temperature protection function. The backlight driver IC 1 sends own temperature information to the detection module 4. When the temperature of the backlight driver IC 1 is lower than the protection temperature, the detection module 4 sends a high-level signal to the protection pin 2, when the temperature of the backlight driver IC 1 is greater than the protection temperature, the detection module 4 sends a low-level signal to the protection pin 2, and the backlight driver IC 1 enters the protection mode.

This is the fourth circuit structure of the temperature control assembly 3. At this moment, a voltage of the second resistor R2 that controls the controllable switch Q1. If the bimetallic strip temperature controller W is connected to the high-level third reference voltage V3, the two bimetallic strips of the bimetallic strip temperature controller W in initial state are disconnected, the circuit is turned off, the voltage of the second resistor R2 is zero, and the controllable switch Q1 is turned off. When temperature of the backlight driver IC 1 reaches the preset temperature, the two bimetallic strips of the bimetallic strip temperature controller are electrically connected, the circuit is turned on, the voltage of the second resistor R2 is equal to the high-level third reference voltage V3, and the controllable switch Q1 is turned on. Thus, the voltage signal connected to the controllable switch Q1 is either a low-level signal or a high-level signal, the voltage of low-level signal is significantly lower than the connection voltage of the controllable Q1, the voltage of the high-level signal is significantly greater than the connection voltage of the controllable Q1, and there is a significant difference between the two level signals. Thus, the controllable switch Q1 can accurately operate.

The comparator U1 is used in the example on the basis of the first example. Because the output signal of the comparator U1 is either a low-level signal or a high-level signal, there is a significant difference between the two level signals, the voltage of the low-level signal is significantly lower than the connection voltage of the controllable switch Q1, and the voltage of the high-level signal is significantly greater than the connection voltage of the controllable switch Q1. Thus, the controllable switch Q1 can accurately operate.

The present disclosure is described in detail in accordance with, the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

The invention claimed is:

1. A protection circuit of a backlight driver circuit, comprising: a monitoring unit that monitors a temperature of the backlight driver circuit; wherein the backlight driver circuit comprises a protection pin that controls a backlight driver integrated circuit (IC) to enter a protection mode; when the temperature of the backlight driver circuit exceeds a preset temperature, the monitoring unit sends a protection signal to the protection pin to control the backlight driver IC to enter the protection mode;

wherein the protection circuit for a backlight, driver circuit further comprises a detection module that detects the temperature of the backlight driver IC; a third resistor is connected between an output end of the detection module and the protection pin of the backlight driver IC.

2. The protection circuit of the backlight driver circuit of claim 1, wherein the monitoring unit comprises a controllable switch that is connected in series between the protection pin and a ground end of the backlight driver circuit, and a control end of the controllable switch is coupled to a temperature control assembly;

when the temperature of the backlight driver circuit exceeds the preset temperature, the temperature control assembly controls the controllable switch to turn on.

3. The protection circuit of the backlight driver circuit of claim 2, wherein the temperature control assembly comprises a high-level first reference voltage; a first resistor and a thermistor are connected in series between the high-level first reference voltage and the ground end of the backlight driver circuit; the thermistor are configured with one end directly connected to the first resistor and the other end directly connected to the ground end of the backlight driver circuit; and the control end of the controllable switch is coupled between the first resistor and the thermistor.

4. The protection circuit of the backlight driver circuit of claim 3, wherein the thermistor has a positive temperature coefficient and is connected to the ground end of the backlight driver circuit; wherein the controllable switch is turned on at a high level.

5. The protection circuit of the backlight driver circuit of claim 3, wherein the temperature control assembly comprises a comparator; a non-inverting input end of the comparator is coupled between the first resistor and the thermistor, an inverting input end of the comparator is coupled to a second reference voltage, and an output end of the comparator is coupled to the control end of the controllable switch.

6. The protection circuit for a backlight driver circuit of claim 2, wherein the temperature control assembly comprises a high-level third reference voltage; a second resistor and a bimetallic strip temperature controller are connected in series between high-level the third reference voltage and the ground end of the backlight driver circuit, and the control end of the controllable switch is coupled between the second resistor and the bimetallic strip temperature controller;

when the temperature of the backlight driver circuit exceeds the preset temperature, two bimetallic strips of the bimetallic strip temperature controller are electrically connected.

7. The protection circuit of the backlight driver circuit of claim 6, wherein the temperature control assembly comprises a comparator; a non-inverting input end of the comparator is coupled between the second resistor and the bimetallic strip temperature controller, an inverting input end of the comparator is coupled to a fourth reference voltage, and an output end of the comparator is coupled to the control end of the controllable switch.

8. A backlight driver circuit, comprising: a backlight driver integrated circuit (IC) and a protection circuit; wherein the backlight driver IC comprises a protection pin that controls the backlight driver IC to enter a protection mode; the protection circuit comprises a monitoring unit that monitors a temperature of the backlight driver circuit; when the temperature of the backlight driver circuit exceeds the preset temperature, the monitoring unit sends a protection signal to the protection pin to control the backlight driver IC to enter the protection mode;

wherein the protection circuit of the backlight driver circuit comprises a detection module that detects the temperature of the backlight driver IC; a third resistor is connected between an output end of the detection module and the protection pin of the backlight driver IC.

9. The backlight driver circuit of claim 8, wherein the monitoring unit comprises a controllable switch; the controllable switch is connected in series between the protection pin and a ground end of the backlight driver circuit, and a control end of the controllable switch is coupled to a temperature control assembly;

when the temperature of the backlight driver circuit exceeds the preset temperature, the temperature control assembly controls the controllable switch to turn on.

10. The backlight driver circuit of claim 9, wherein the temperature control assembly comprises a high-level first reference voltage; a first resistor and a thermistor are connected in series between the high-level first reference voltage and the ground end of the backlight driver circuit, the thermistor are configured with one end directly connected to the first resistor and the other end directly connected to the ground end of the backlight driver circuit; and the control end of the controllable switch is coupled between the first resistor and the thermistor.

11. The backlight driver circuit of claim 10, wherein the thermistor has a positive temperature coefficient and is connected to the ground end of the backlight driver circuit; wherein the controllable switch is turned on at a high level.

12. The backlight driver circuit of claim 10, wherein the temperature control assembly comprises a comparator; a non-inverting input end of the comparator is coupled between the first resistor and the thermistor, an inverting input end of the comparator is coupled to a second reference voltage, and an output end of the comparator is coupled to the control end of the controllable switch.

13. The backlight driver circuit of claim 9, wherein the temperature control assembly comprises a high-level third reference voltage; a second resistor and a bimetallic strip temperature controller are connected in series connection between the high-level third reference voltage and the ground end of the backlight driver circuit, and the control end of the controllable switch is coupled between the second resistor and the bimetallic strip temperature controller;

when the temperature of the backlight driver circuit exceeds the preset temperature, two bimetallic strips of the bimetallic strip temperature controller are electrically connected.

14. The backlight driver circuit of claim 13, wherein the temperature control assembly comprises a comparator; a non-inverting input end of the comparator is coupled between the second resistor and the bimetallic strip temperature controller, an inverting input end of the comparator is coupled to a fourth reference voltage, and an output end of the comparator is coupled to the control end of the controllable switch.

15. A liquid crystal display (LCD) device, comprising: the backlight drive circuit of claim 8.

* * * * *